US012675400B2

(12) United States Patent
Jin et al.

(10) Patent No.: US 12,675,400 B2
(45) Date of Patent: Jul. 7, 2026

(54) WEAR LEVELING METHOD, SOLID-STATE DRIVE AND STORAGE MEDIUM

(71) Applicant: T-Head (Chengdu) Semiconductor Co., Ltd., Chengdu (CN)

(72) Inventors: Jiajing Jin, Hangzhou (CN); Jiu Heng, Chengdu (CN); Xiang Gao, Shanghai (CN)

(73) Assignee: T-HEAD (CHENGDU) SEMICONDUCTOR CO., LTD., Chengdu (CN)

( * ) Notice: Subject to any disclaimer, the term of this patent is extended or adjusted under 35 U.S.C. 154(b) by 0 days.

(21) Appl. No.: 19/003,767

(22) Filed: Dec. 27, 2024

(65) Prior Publication Data

US 2025/0252047 A1 Aug. 7, 2025

(30) Foreign Application Priority Data

Feb. 1, 2024 (CN) .......................... 202410150267.2

(51) Int. Cl.
*G06F 12/02* (2006.01)

(52) U.S. Cl.
CPC .. *G06F 12/0246* (2013.01); *G06F 2212/7211* (2013.01)

(58) Field of Classification Search
CPC ......... G06F 12/0246; G06F 2212/7211; G06F 2212/1036; G06F 3/0644
See application file for complete search history.

(56) References Cited

U.S. PATENT DOCUMENTS

| | | | |
|---|---|---|---|
| 7,948,798 B1 * | 5/2011 | Sheredy ................. | G06F 3/064 |
| | | | 365/185.11 |
| 10,902,929 B1 * | 1/2021 | Pawlowski ......... | G06F 12/0873 |
| 2010/0095051 A1 * | 4/2010 | Chen ................... | G06F 12/0246 |
| | | | 711/E12.001 |

FOREIGN PATENT DOCUMENTS

| | | |
|---|---|---|
| CN | 112131139 B | 7/2024 |
| CN | 111273858 B | 10/2024 |
| CN | 110750209 B | 12/2024 |

OTHER PUBLICATIONS

Chen et al., ZoneLife: How to Utilize Data Lifetime Semantics to Make SSDs Smarter, 2022, IEEE, 12 pages (Year: 2022).*

* cited by examiner

*Primary Examiner* — Gary W. Cygiel

(74) *Attorney, Agent, or Firm* — Birch, Stewart, Kolasch & Birch, LLP

(57) ABSTRACT

Provided are a solid-state drive and a wear leveling method. The solid-state drive includes a plurality of zones, a mapping relationship and an SSD controller. The SSD controller is configured to: determine, according to the mapping relationship, an identifier of a first target zone corresponding to an identifier of a to-be-written zone in response to receiving a data write command from a host drive unit, and write the to-be-written data to the first target zone. The data write command carries the identifier of the to-be-written zone determined by the host drive unit and to-be-written data, the mapping relationship includes an identifier of an alternate zone corresponding to an identifier of each of the plurality of zones, and the alternate zone of each zone is a zone, determined from the plurality of zones, with fewest programmed/erased cycles.

15 Claims, 5 Drawing Sheets

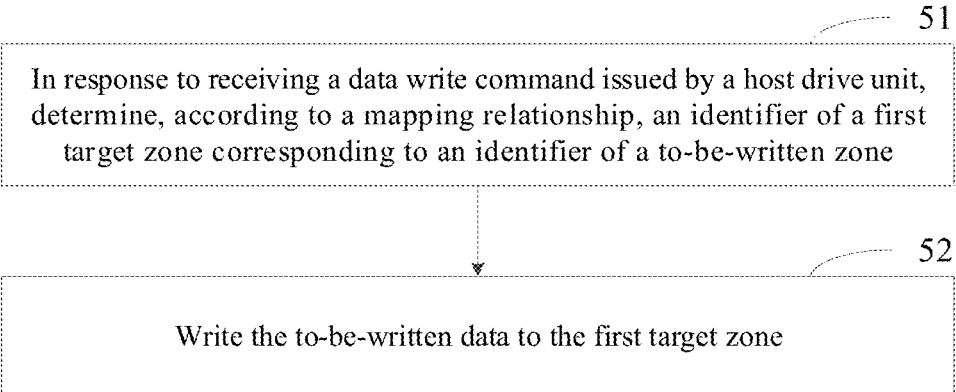

In response to receiving a data write command issued by a host drive unit, determine, according to a mapping relationship, an identifier of a first target zone corresponding to an identifier of a to-be-written zone Write the to-be-written data to the first target zone

FIG. 5

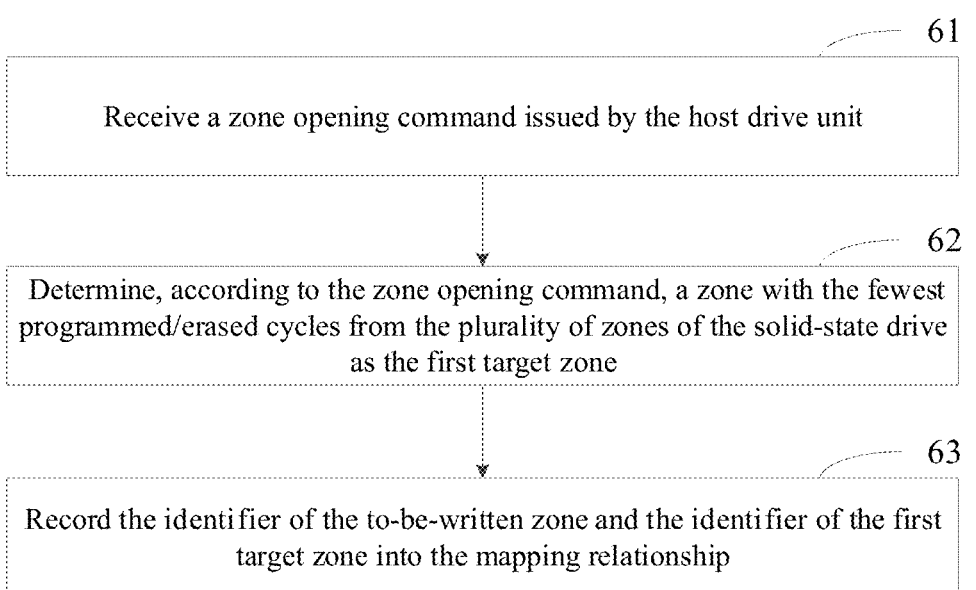

Receive a zone opening command issued by the host drive unit

Determine, according to the zone opening command, a zone with the fewest programmed/erased cycles from the plurality of zones of the solid-state drive as the first target zone Record the identifier of the to-be-written zone and the identifier of the first target zone into the mapping relationship

FIG. 6

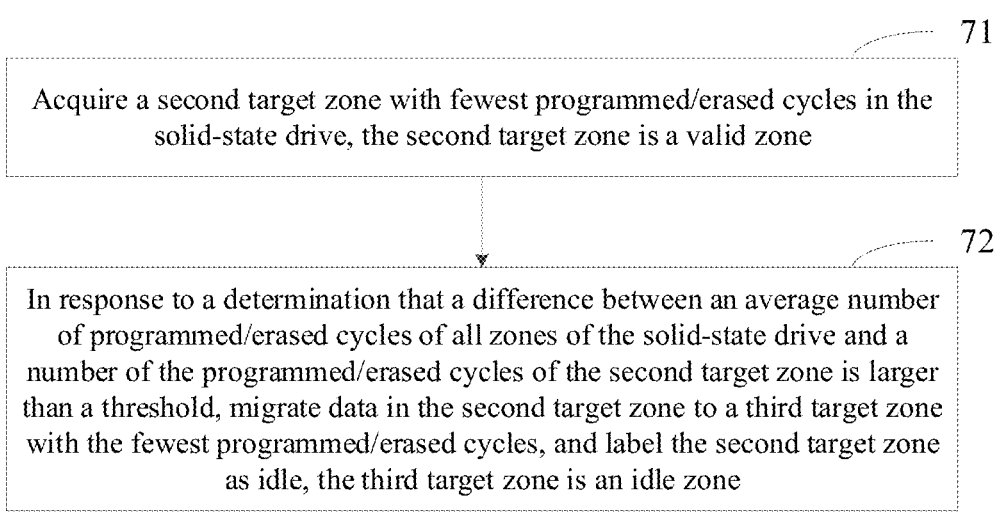

71

Acquire a second target zone with fewest programmed/erased cycles in the solid-state drive, the second target zone is a valid zone

72

In response to a determination that a difference between an average number of programmed/erased cycles of all zones of the solid-state drive and a number of the programmed/erased cycles of the second target zone is larger than a threshold, migrate data in the second target zone to a third target zone with the fewest programmed/erased cycles, and label the second target zone as idle, the third target zone is an idle zone

FIG. 7

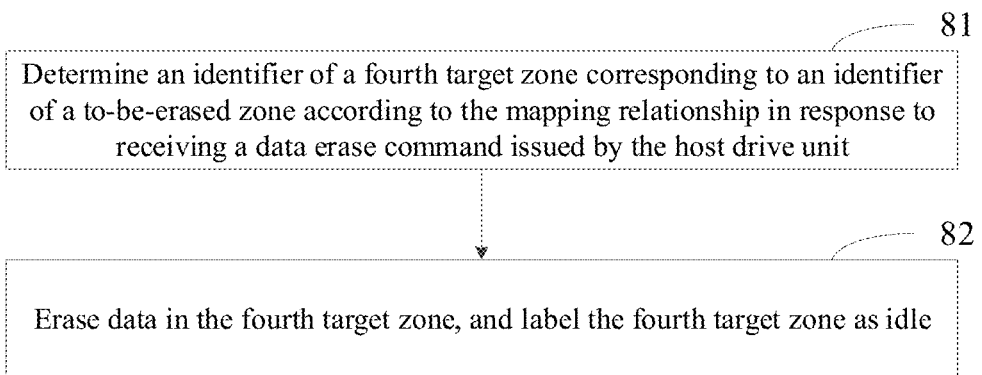

81

Determine an identifier of a fourth target zone corresponding to an identifier of a to-be-erased zone according to the mapping relationship in response to receiving a data erase command issued by the host drive unit

82

Erase data in the fourth target zone, and label the fourth target zone as idle

FIG. 8

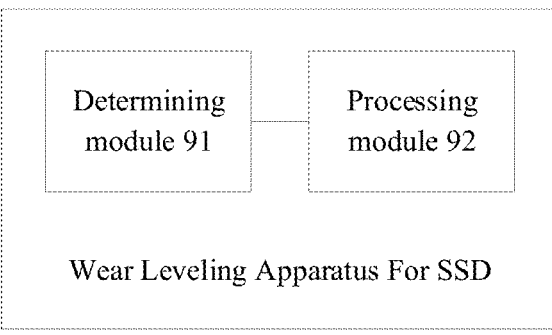

Determining module 91     Processing module 92

Wear Leveling Apparatus For SSD

FIG. 9

WEAR LEVELING METHOD, SOLID-STATE DRIVE AND STORAGE MEDIUM

CROSS-REFERENCE TO RELATED APPLICATIONS

The present application claims the priority of Chinese Patent Application No. 202410150267.2, entitled "Wear Leveling Method and Apparatus For Solid-State Drive", and filed with the China National Intellectual Property Admin- istration on Feb. 1, 2024, which is incorporated in the present disclosure by reference in its entirety.

TECHNICAL FIELD

The present disclosure relates to the technical field of integrated circuit, and in particular to a wear leveling method, a solid-state drive, and a storage medium.

BACKGROUND

NAND Flash in a solid-state drive (SSD) is managed according to Zones. Each zone on each NAND is an independent space. A host drive unit sends a write command and data to the SSD, and the data is stored in a corresponding zone of the SSD.

In the above implementation, the SSD needs to report residual program/erase (PE) cycles of each zone to the host drive unit every time it is powered on. Then, when the data is written to the SSD, the zone with more residual program/ erase cycles is selected according to reported information, and the write operation is performed in this zone. However, the above method increases a burden on the host drive unit.

SUMMARY

The present disclosure provides a wear leveling method for a solid-state drive, a solid-state drive, and a storage medium.

In one aspect of the present disclosure, a wear leveling method for a solid-state drive is provided. The wear leveling method includes: determining an identifier of a first target zone corresponding to an identifier of a to-be-written zone according to a pre-acquired mapping relationship in response to receiving a data write command issued by a host drive unit; and writing the to-be-written data to the first target zone. The data write command carries the identifier of the to-be-written zone determined by the host drive unit and to-be-written data, the mapping relationship includes an identifier of an alternate zone corresponding to an identifier of each zone, and the alternate zone corresponding to each zone is a zone, determined from a plurality of zones of the solid-state drive, with fewest programmed/erased cycles In some embodiments, before the determining an identi- fier n of a first target zone corresponding to an identifier of a to-be-written zone according to a mapping relationship, the method further includes: receiving a zone opening command issued by the host drive unit, where the zone opening command carries the identifier of the to-be-written zone; determining, according to the zone opening command, a zone with the fewest programmed/erased cycles from the plurality of zones of the solid-state drive as the first target zone; and recording the identifier of the to-be-written zone and the identifier of the first target zone into the mapping relationship.

In some embodiments, the method further includes: acquiring a second target zone with fewest programmed/ erased cycles in the solid-state drive, the second target zone being a valid zone; and migrating, in response to a deter- mination that a difference between an average number of programmed/erased cycles of all zones of the solid-state drive and a number of the programmed/erased cycles of the second target zone is larger than a threshold, data in the second target zone to a third target zone with the fewest programmed/erased cycles, and labeling the second target zone as idle, the third target zone being an idle zone.

In some embodiments, the method further includes: updating the identifier of the second zone to be an identifier of the third target zone in the mapping relationship.

In some embodiments, the method further includes: deter- mining an identifier of a fourth target zone corresponding to an identifier of a to-be-erased zone according to the mapping relationship in response to receiving a data erase command issued by the host drive unit; and erasing data in the fourth target zone, and labeling the fourth target zone as idle.

In some embodiments, the method further includes: delet- ing a correspondence relationship between the identifier of the to-be-erased zone and the identifier of the fourth target zone from the mapping relationship.

In some embodiments, the method further includes: deter- mining an identifier of a fifth target zone corresponding to an identifier of a to-be-read zone from the mapping relationship in response to receiving a data read command issued by the host drive unit, where the data read command carries the identifier of the to-be-read zone; and reading data from the fifth target zone, and sending the data to the host drive unit.

In another aspect of the present disclosure, a solid-state drive is provided, including: a plurality of zones; a mapping relationship; and an SSD controller. The SSD controller is configured to: determine, according to the mapping relation- ship, an identifier of a first target zone corresponding to an identifier of a to-be-written zone in response to receiving a data write command issued by a host drive unit, wherein the data write command carries the identifier of the to-be- written zone determined by the host drive unit and to-be- written data, the mapping relationship comprises an identi- fier of an alternate zone corresponding to an identifier of each of the plurality of zones, and the alternate zone of each zone is a zone, determined from the plurality of zones, with fewest programmed/erased cycles; and write the to-be- written data to the first target zone.

In some embodiments, before determining, according to a mapping relationship, an identifier of a first target zone corresponding to an identifier of a to-be-written zone, the SSD controller is further configured to: receive a zone opening command from the host drive unit, wherein the zone opening command carries the identifier of the to-be-written zone; determine, according to the zone opening command, the zone with the fewest programmed/erased cycles from the plurality of zones of the solid-state drive as the first target zone; and record the identifier of the to-be-written zone and the identifier of the first target zone into the mapping relationship.

In some embodiments, the SSD controller is further configured to: acquire a second target zone with fewest programmed/erased cycles in the solid-state drive, wherein the second target zone is a valid zone; and in response to a determination that a difference between an average number of programmed/erased cycles of all the plurality of zones of the solid-state drive and a number of programmed/erased cycles of the second target zone is larger than a threshold, migrate data in the second target zone to a third target zone with the fewest programmed/erased cycles, and label the second target zone as idle, wherein the third target zone is an idle zone.

In some embodiments, the SSD controller is further configured to: update the identifier of the second zone to an identifier of the third target zone in the mapping relationship.

In some embodiments, the SSD controller is further configured to: determine, according to the mapping relationship, an identifier of a fourth target zone corresponding to an identifier of a to-be-erased zone in response to receiving a data erase command issued by the host drive unit; and erase data in the fourth target zone, and label the fourth target zone as idle.

In some embodiments, the SSD controller is further configured to: delete a correspondence relationship between the identifier of the to-be-erased zone and the identifier of the fourth target zone from the mapping relationship.

In some embodiments, the SSD controller is further configured to: determine an identifier of a fifth target zone corresponding to an identifier of a to-be-read zone from the mapping relationship in response to receiving a data read command issued by the host drive unit, wherein the data read command carries the identifier of the to-be-read zone; and read data from the fifth target zone, and send the data to the host drive unit.

In yet another aspect, the embodiment of the present disclosure provides a non-transitory computer readable storage medium, storing computer-executable instructions. The computer-executable instructions, when executed by a processor, are configured to implement the above wear leveling method.

A wear leveling method and a solid-state drive are provided by the embodiments of the present disclosure. In the method, the identifier of the first target zone corresponding to the identifier of the to-be-written zone is determined according to the mapping relationship in response to receiving the data write command issued by the host drive unit. The data write command carries the identifier of the to-be-written zone determined by the host drive unit and the to-be-written data, the mapping relationship includes the identifier of the alternate zone corresponding to the identifier of each zone, and the alternate zone corresponding to each zone is a zone, determined from the plurality of zones of the solid-state drive, with the fewest programmed/erased cycles. Then, the to-be-written data is written to the first target zone. The solid-state drive can determine any zone with fewest programmed/erased cycles to replace the to-be-written zone determined by the host drive unit, it is avoided that the host drive unit needs to receive programmed/erased cycles of all zones in the solid-state drive to determine a more appropriate corresponding zone for data writing, thereby reducing a burden on the host drive unit. By using a mapping table, the host drive unit can find the zone that actually stores the corresponding data according to the mapping table to achieve accurate read and write operations.

BRIEF DESCRIPTION OF DRAWINGS

The present disclosure will be understood more fully from the detailed description given below and from the accompanying drawings of various embodiments of the disclosure. The illustrative embodiments and descriptions of the present disclosure are used to explain the present disclosure, and do not constitute restrictions on the present disclosure. In the drawings.

4

Figure 2:
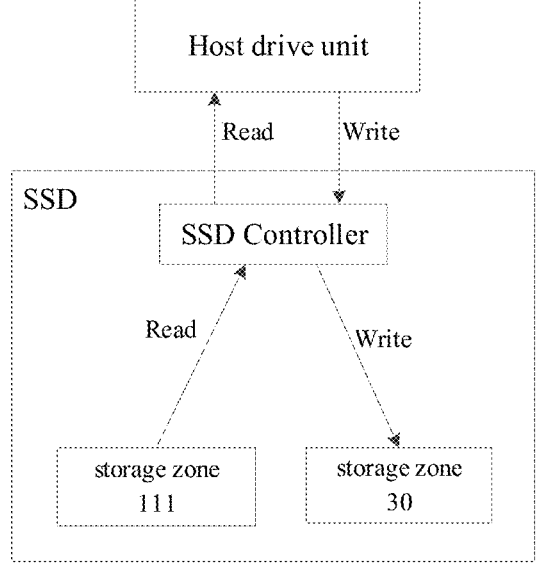
Figure 3:
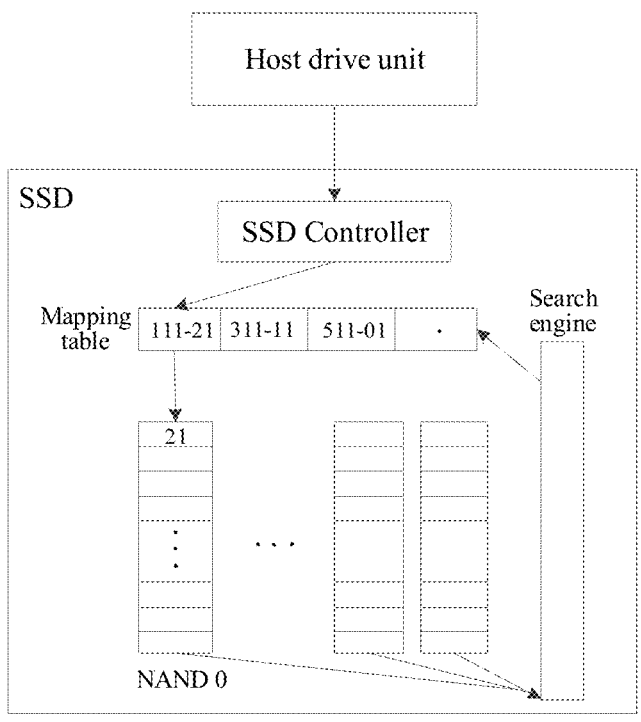
Figure 4:
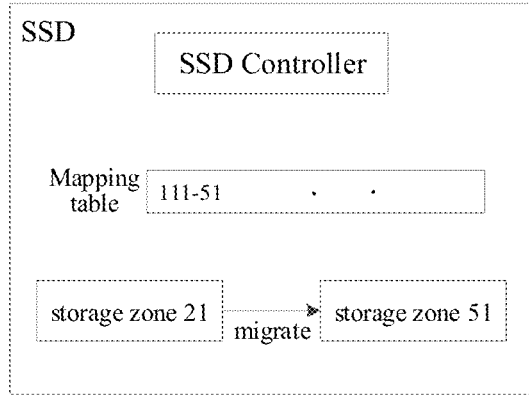
Figure 10:
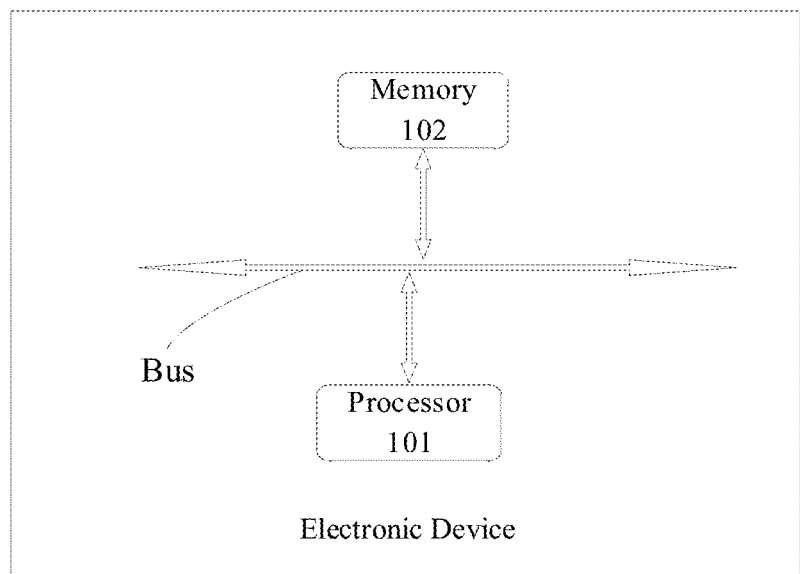

FIG. 2 is a schematic diagram of interaction between a host drive unit and a solid-state drive in another existing art;

FIG. 3 is a schematic diagram of interaction between a host drive unit and a solid-state drive according to some embodiments of the present disclosure;

FIG. 4 is a schematic diagram of interaction between a host drive unit and a solid-state drive according to some embodiments of the present disclosure;

FIG. 5 is a schematic flowchart of a wear leveling method for a solid-state drive according to some embodiments of the present disclosure;

FIG. 6 is a schematic flowchart of a wear leveling method for a solid-state drive according to some embodiments of the present disclosure;

FIG. 7 is a schematic flowchart of a wear leveling method for a solid-state drive according to some embodiments of the present disclosure;

FIG. 8 is a schematic flowchart of a wear leveling method for a solid-state drive according to some embodiments of the present disclosure;

FIG. 9 is a schematic structural diagram of a wear leveling apparatus for a solid-state drive according to some embodiments of the present disclosure; and FIG. 10 is a schematic structural diagram of an electronic device according to some embodiments of the present disclosure.

DETAILED DESCRIPTION

In order to make the purpose, technical solutions and advantages of the present disclosure clearer, the technical solutions in the present disclosure will be clearly and completely described below with reference to the specific embodiments and the corresponding drawings of the present disclosure. Apparently, the described embodiments are only part rather than all of the embodiments of the present disclosure. On the basis of the embodiments in the present disclosure, all other embodiments acquired by those of ordinary skill in the art without creative efforts fall within a protection scope of the present disclosure. User information (including, but not limited to, user equipment information, user personal information, etc.) and data (including, but not limited to, data for analysis, storage, displayed, etc.) involved in the present disclosure are all information and data authorized by a user or fully authorized by parties. Collection, use, and processing of relevant data need to comply with relevant laws and regulations and standards of relevant countries and regions, and provide corresponding operating entrances for the user to select authorization or rejection.

NAND Flash in a solid-state drive (SSD) is managed according to zones. Each zone on each NAND is an independent space. A host drive unit (Host) sends a write command and data to the SSD, and the data is stored in a corresponding zone of the SSD.

In some embodiments, the SSD may be a Zoned Namespace (ZNS) SSD.

Figure 1:
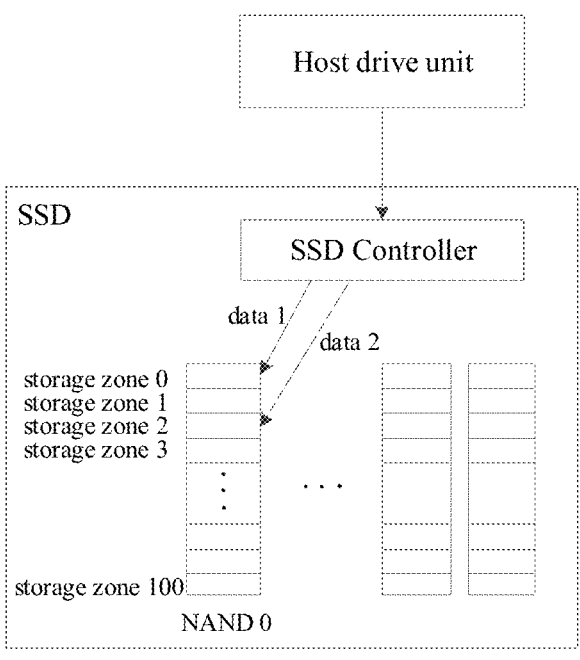
FIG. 1 is a schematic diagram of interaction between a host drive unit and a solid-state drive in an existing art.

FIG. 1 is a schematic diagram of interaction between a host drive unit and a solid-state drive in an existing art. As shown in FIG. 1, the schematic diagram of interaction includes a host drive unit and a solid-state drive.

The solid-state drive includes: an SSD controller and a plurality of NAND Flashes. Each NAND Flash includes a plurality of zones (for example, NAND Flash 0 includes a zone 0, a zone 1, a zone 2, a zone 3, . . . a zone 100).

For example, the SSD controller transfers data 1 to the zone 0 in the NAND Flash 0, and transfers data 2 to the zone 2 in the NAND Flash 0.

In the system shown in FIG. 1, the SSD manages the NAND Flashes based on zones, and each zone is an independent space. Before data storage, the Host issues a zone opening command and an identifier (Zone ID) of a target zone, to inform SSD of the target zone. The SSD labels this target zone as being in use after reception of the zone opening command, and then the Host sends the data to the SSD and stores the data in the target zone. After data is invalid, the Host issues a zone reset command. After reception of the zone reset command, the SSD erases the NAND block corresponding to the zone, and adds 1 to a program/ erase (PE) count every erase, and the corresponding zone is labeled as idle for use by a next open.

The number of program/erase (PE) cycles of each NAND Flash is limited. When the program/erase cycles of one NAND Flash reach a threshold value specified by a manufacturer, this NAND Flash can no longer be used. This will lead to a reduction in a storage space of the SSD, and the full disc may be scrapped earlier than expected.

Therefore, it is expected that the program/erase cycles of all the NAND Flashes reach their threshold at the same time, and a utilization rate of such SSD is maximal. This is achieved by wear management.

Currently, the Host decides which zone to store the data, so the Host needs to know a PE value (the number of program/erase cycles that have been performed) of each zone, and find the zone with a minimum PE value for each data writing.

In the above implementation, the SSD needs to report the PE value (the programmed/erased cycles) of each zone to the Host every time it is powered on. Then, when the data is written, the zone with a few program/erase cycles is selected according to reported information, and then a write operation is performed in this zone.

As stated above, the SSD reports the PE values of all zones to the Host, and the Host needs to find the zone with the minimum PE cycle for data writing each time, which causes a burden on the Host. In particular, if many SSDs are installed on one server, a burden of the Host for finding the minimum PE cycle will be more obvious.

FIG. 2 is a schematic diagram of interaction between a host drive unit and a solid-state drive in another existing art. As shown in FIG. 2, the schematic diagram of interaction includes a host drive unit and a solid-state drive.

Illustration is made with the solid-state drive including a SSD controller, a zone 111, and a zone 30 as an example.

In FIG. 1, the Host issues the open command to select the zone with the minimum PE cycle to improve the wear leveling. If data stored on a certain Zone is valid for a long time, the Host does not issue the zone reset command, which will also cause the PE cycle of this zone to be smaller than those of other zones. An extreme case is that other zones have reached their maximum allowable PE cycles, but the PE value of this zone is still 1. In order to solve this problem, when a difference between the PE value of the valid zone and the average PE value of the full disc reaches a preset number, the Host will actively read out data of this zone, and rewrite it back to one of the idle zones in the SSD, which has the minimum PE value among the idle zones.

For example, the data on the zone 111 has not been erased, and a number of the programmed/erased cycles of the zone 111 is 1. At this time, the data on the zone 111 may be written to an idle zone with a few programmed/erased cycles, such as a zone 30.

That is, the data on the zone 111 may be migrated to the zone 30, and the zone 111 may be rest for writing new data.

However, the above existing wear leveling method has the following problems: the burden on the host drive unit is too large, which affects performance of a system; and a zone with a small PE value is occupied and valid for a long time.

In view of the problems, the inventor has found that if the zone with the fewest programmed/erased cycles is automatically determined by the SSD, after the write command of the host drive unit is obtained, the data is written to the zone with the fewest programmed/erased cycles. Compared with the above existing art that the host drive unit needs to read states and the programmed/erased cycles of all the zones in the SSD, the burden of the host drive unit is reduced. A table is added, and the table contains a mapping relationship between the identification of the zone indicated by the host drive unit's write command and the identification of the zone to which the data is actually written, so that the actual zone can be correctly found in subsequent erasing, reading, and migration without affecting normal read and write operations, and the burden on the host drive unit during allocation of the zones is reduced.

FIG. 3 is a schematic diagram of interaction between a host drive unit and a solid-state drive according to some embodiments of the present disclosure. As shown in FIG. 3, the schematic diagram of interaction includes a host drive unit and a solid-state drive (SSD).

The solid-state drive includes: an SSD controller, a mapping table, a search engine, a plurality of NAND Flashes, where each NAND Flash includes a plurality of zones.

Compared with FIG. 1 in the existing art, the mapping table and the search engine are added in FIG. 3 of the embodiment of the present disclosure. Specifically, the mapping table records a mapping relationship between the zone indicated by the write command from the host and the zone actually determined in the SSD, and when the host sends a command to open a certain zone, the search engine finds a zone with the minimum PE value from idle zones of the SSD, and establishes a mapping relationship in a zone mapping table to record the correspondence between the zone indicated by the host and the zone actually determined in the SSD.

In some embodiments, the function of the search engine is implemented by the SSD controller, and the mapping table is updated by the SSD controller. In another embodiment, the search engine is an independent processing unit. The mapping table may be an independent storage unit.

For example, the zone indicated by the host may be denoted as Host Zone, and the Zone determined by the search engine may be denoted as In-Disc Zone. The mapping table may record a plurality of correspondence items (for example, Host Zone 111-In-Disc Zone 21, Host Zone 311-In-Disc Zone 11, and Host Zone 511-In-Disc Zone 01).

FIG. 4 is a schematic diagram of interaction between a host drive unit and a solid-state drive according to some embodiments of the present disclosure. As shown in FIG. 4, the schematic diagram of interaction includes a host drive unit and a solid-state drive.

Illustration is made with the solid-state drive including an SSD controller, a mapping table, a zone 21, and a zone 51 as an example.

In some embodiments, the correspondence Host Zone 111-In-Disc Zone 21 is recorded in the mapping table. The SSD can automatically check whether a difference between an average PE value of the full disc (the average PE value of the zones of the NAND Flashes) and the PE value of a valid zone (this valid zone has the minimum PE value among the valid zones) is greater than a threshold. In response to determining that the difference is greater than the threshold, the data is migrated in the SSD (for example, to an In-Disc Zone 51), and the mapping table is updated to Host Zone 111-In-Disc Zone 51, no longer needing the Host to read the data back, and then write the data back.

The following further explains the technical solutions of the present disclosure in detail by means of specific embodiments. It is to be noted that the following embodiments can exist alone or in combination; and for the same or similar content, they are not repeated in different embodiments.

FIG. 5 is a schematic flowchart of a wear leveling method for a solid-state drive according to some embodiments of the present disclosure. Referring to FIG. 5, the wear leveling method for a solid-state drive includes the following steps.

In Step 51, it is determined, according to a pre-acquired mapping relationship, an identifier of a first target zone corresponding to an identifier of a to-be-written zone in response to receiving a data write command issued by a host drive unit.

The data write command carries the identifier of the to-be-written zone determined by the host drive unit and to-be-written data, the mapping relationship includes an identifier of an alternate zone corresponding to an identifier of each zone, and the alternate zone of each zone is a zone, determined from a plurality of zones of the solid-state drive, with the minimum programmed/erased cycles.

In this step, the host drive unit issues the data write command, and the solid-state drive receives the data write command. Then, the solid-state drive obtains, from the data write command, the to-be-written data and the identifier of the to-be-written zone determined by the host drive unit.

Furthermore, the solid-state drive determines the identifier of the first target zone corresponding to the identifier of the to-be-written zone from the mapping relationship based on the identifier of the to-be-written zone.

In some embodiments, before reception of the data write command, the solid-state drive determines the identifier of the first target zone corresponding to the identifier of the to-be-written zone, that is, the first target zone replaces the to-be-written zone as a zone to which the to-be-written data is written.

In some embodiments, the solid-state drive finds one or more idle zones with the fewest programmed/erased cycles from the zones of the NAND Flashes, and takes any one of the one or more zones with the fewest programmed/erased cycles as the first target zone.

In step 52, the to-be-written data is stored in the first target zone.

In this step, after determining the first target zone corresponding to the identifier of the to-be-written zone, the to-be-written data in the data write command is written to the first target zone.

For the wear leveling method provided by the embodiment of the present disclosure, the identifier of the first target zone corresponding to the identifier of the to-be-written zone is determined according to the mapping relationship when the data write command issued by the host drive unit is received. The data write command carries the identifier of the to-be-written zone determined by the host drive unit and the to-be-written data, the mapping relationship includes the identifier of the alternate zone corresponding to the identifier of each zone, and the alternate zone corresponding to each zone is any zone, determined from the plurality of zones of the solid-state drive, with the fewest programmed/erased cycles; and then the to-be-written data is written to the first target zone. In the technical solution, the solid-state drive can determine any zone with fewest programmed/erased cycles to replace the to-be-written zone determined by the host drive unit. It is avoided that the host drive unit needs to receive programmed/erased cycles of all zones in the solid-state drive to determine a more appropriate zone for data writing, thereby reducing a burden on the host drive unit. By using a mapping table, the host drive unit can find the zone that actually stores the corresponding data according to the mapping table to achieve accurate read and write operations.

FIG. 6 is a schematic flowchart of a wear leveling method for a solid-state drive provided by an embodiment of the present disclosure. Referring to FIG. 6, before step 41, the wear leveling method further includes steps 61 to 63.

In Step 61, a zone opening command issued by the host drive unit is received.

The zone opening command carries the identifier of the to-be-written zone.

In this step, the host drive unit issues the zone opening command to the solid-state drive, and the zone opening command carries the Zone ID (this Zone ID is also referred to Host Zone ID since it is determined and recognized by the host drive unit), i.e. the identifier of the to-be-written zone.

In Step 62, it is determined, according to the zone opening command, a zone with the fewest programmed/erased cycles from the plurality of zones of the solid-state drive as the first target zone.

In this step, based on the identifier of the to-be-written zone in the zone opening command, the zone with the fewest programmed/erased cycles is found and determined from the plurality of zones of the solid-state drive.

For distinguishment, the zone identifier in the solid-state drive is denoted as In-Disc Zone ID.

Further, if there are multiple zones with the fewest programmed/erased cycles, any one is selected as the first target zone; and if there is only one zone with the fewest programmed/erased cycles, this one is used as the first target zone.

In Step 63, the identifier of the to-be-written zone and the identifier of the first target zone are recorded into the mapping relationship.

In this step, the identifier of the to-be-written zone in the zone opening command issued by the host drive unit and the identifier of the first target zone are recorded in the mapping relationship as a correspondence relationship, so that they are easily found in the mapping relationship during subsequent reception of the data write command issued by the host drive unit.

Further, in the above embodiment, based on the mapping relationship, there may further be the following operations.

An identifier of a fifth target zone corresponding to an identifier of a to-be-read zone are determined from the mapping relationship in response to receiving a data read command issued by the host drive unit. The data read command carries the identifier of the to-be-read zone, and the data is read from the fifth target zone, and sent to the host drive unit.

For example, after issue of the data write command by the host drive unit, the data write command carries the identifier of the zone where the host drive unit considers as the storage zone of the data, and the zone actually storing the to-be-written data may be different from the storage zone where the host drive unit considers the data is stored. However, this correspondence relationship is recorded in the mapping relationship. At this time, during subsequent reception of the data read command issued by the host drive unit, the zone (i.e. the fifth target zone) actually storing the corresponding data may be found from the mapping relationship according to the identifier of the zone where the host drive unit considers the data is stored, and then the corresponding data is read from the fifth target zone, and returned to the host drive unit.

For the wear leveling method provided by the embodiment of the present disclosure, the zone opening command issued by the host drive unit is received, the zone opening command carries the identifier of the to-be-written zone, a zone with the fewest programmed/erased cycles is determined from the plurality of zones of the solid-state drive as the first target zone according to the zone opening command, and the identifier of the to-be-written zone and the identifier of the first target zone are recorded in the mapping relationship. In this technical solution, a zone with the fewest programmed/erased cycles from the plurality of zones corresponds to the to-be-written zone indicated by the zone opening command, a realization basis for subsequent reception of a formal data write command for data writing is provided.

FIG. 7 is a schematic flowchart of a wear leveling method for a solid-state drive provided by an embodiment of the present disclosure. Referring to FIG. 7, the wear leveling method further includes step 71-72.

In Step 71, a second target zone with fewest programmed/erased cycles in the solid-state drive is acquired, and the second target zone is a valid zone.

There may be a certain zone in the SSD, and data stored in this zone is valid for a long time. If the Host does not issue a zone reset command, the PE value of this zone is smaller than those of other zones. An extreme case is that other zones have reached a limit of the maximum programmable/erasable cycles, but the PE value of this zone is still 1. In order to solve this problem, the second target zone with the fewest programmed/erased cycles in the solid-state drive may be acquired.

The valid second target zone with the fewest programmed/erased cycles may be a zone storing data but having the fewest programmed/erased cycles among all the zones storing data.

In Step 72, in response to a determination that a difference between an average number of programmed/erased cycles of all zones of the solid-state drive and a number of the programmed/erased cycles of the second target zone is larger than a preset threshold, data in the second target zone is migrated to a third target zone with the fewest programmed/erased cycles, the third target zone is an idle zone, and the second target zone is labeled as idle.

In this step, when a different between a number of the programmed/erased cycles of the valid zone with the fewest programmed/erased cycles and an average number of the programmed/erased cycles of the zones of the full disc reaches a threshold, the solid-state drive will read out the data from the zone (i.e., the second target zone) with the fewest programmed/erased cycles, and migrate the data in the second target zone to the idle zone with the fewest programmed/erased cycles (the idle zone having the fewest programmed/erased cycles than other idle zones) in the SSD, that is, to the third target zone.

Further, the second target zone is labeled as idle.

In some embodiments, the method further includes: updating the identifier of the second zone to be an identifier of the third target zone in the mapping relationship.

For example, in the mapping relationship, the previous mapping relationship is Host Zone 111-In-Disc Zone 51 (the identifier of the second target zone), and the updated mapping relationship is Host Zone 111-In-Disc Zone 61 (the identifier of the third target zone).

For the wear leveling method provided by the embodiment of the present disclosure, the valid second target zone with the fewest programmed/erased cycles in the solid-state drive is acquired, when the difference between the number of the average programmed/erased cycles of all the zones of the solid-state drive and the number of the programmed/erased cycles of the second target zone is larger than the threshold, the data in the second target zone is migrated to the idle third target zone with the fewest programmed/erased cycles, and the second target zone is labeled as idle. In the technical solution, the valid zone with the fewest programmed/erased cycles is determined by the SSD, conforming to a judgment rule, and data is migrated to the idle zone with the fewest programmed/erased cycles. It is avoided that the valid zone with the fewest programmed/erased cycles is occupied, and a resource burden caused by an operation of the host drive unit on this event is avoided.

FIG. 8 is a schematic flowchart of a wear leveling method for a solid-state drive provided by an embodiment of the present disclosure. Referring to FIG. 8, the wear leveling method further includes the following steps.

In Step 81, an identifier of a fourth target zone corresponding to an identifier of a to-be-erased zone is determined according to the mapping relationship in response to receiving a data erase command issued by the host drive unit.

In this step, when needing to erase the data, the host drive unit sends the data erase command to the solid-state drive. The solid-state drive obtains the identifier of the to-be-erased zone based on the data erase command.

Further, based on the identifier of the to-be-erased zone, the identifier of the zone corresponding to the identifier of the to-be-erased zone is found in the mapping relationship, that is, the identifier of the fourth target zone.

In Step 82, data in the fourth target zone is erased, and the fourth target zone is labeled as idle.

In this step, the solid-state drive erases the relevant to-be-erased data in the fourth target zone corresponding to the identifier of the fourth target zone determined above, and then modifies a state of the fourth target zone to an idle state. At this time, a number of the programmed/erased cycles of the fourth target zone is added by 1.

In some embodiments, the method further includes: deleting a correspondence relationship between the identifier of the to-be-erased zone and the identifier of the fourth target zone from the mapping relationship.

As the data in the fourth target zone which is idle has been erased, the correspondence relationship between the identifier of the to-be-erased zone and the identifier of the fourth target zone recorded in the mapping relationship is deleted. In this way, the fourth target zone can be used in other subsequent operations such as the write operation, avoiding unnecessary resource occupation.

For the wear leveling method provided by the embodiment of the present disclosure, the identifier of the fourth target zone corresponding to the identifier of the to-be-erased zone is determined according the mapping relationship when the data erase command issued by the host drive unit is received, then the data in the fourth target zone is erased, and the fourth target zone is labeled as idle. In the technical solution, the data is correctly erased by the host drive unit.

FIG. 9 is a schematic structural diagram of a wear leveling apparatus for a solid-state drive provided by an embodiment of the present disclosure. Referring to FIG. 9, the apparatus includes: a determining module 91 and a processing module 92.

The determining module 91 is configured to determine an identifier of a first target zone corresponding to an identifier of a to-be-written zone according to a mapping relationship in response to receiving a data write command issued by a host drive unit. The data write command carries the identifier of the to-be-written zone determined by the host drive unit and to-be-written data, the mapping relationship includes an identifier of an alternate zone corresponding to an identifier of each zone, and the alternate zone corresponding to each zone is a zone, determined from a plurality of zones of the solid-state drive, with fewest programmed/erased cycles.

The processing module 92 is configured to write the to-be-written data to the first target zone.

In some embodiments, before the determining an identifier of a first target zone corresponding to an identifier of a to-be-written zone according to a mapping relationship, the determining module 91 is further configured to: receive a zone opening command issued by the host drive unit, where the zone opening command carries the identifier of the to-be-written zone; determine, according to the zone opening command, a zone with the fewest programmed/erased cycles from the plurality of zones of the solid-state drive as the first target zone; and record the identifier of the to-be-written zone and the identifier of the first target zone into the mapping relationship.

In some embodiments, the determining module 91 is further configured to: acquire a valid second target zone with fewest programmed/erased cycles in the solid-state drive; and migrate, when a difference between an average number of programmed/erased cycles of all zones of the solid-state drive and a number of the programmed/erased cycles of the second target zone is larger than a threshold, data in the second target zone to an idle third target zone with the fewest programmed/erased cycles, and label the second target zone as idle.

In some embodiments, the determining module 91 is further configured to: update the identifier of the second target zone to be an identifier of the third target zone in the mapping relationship.

In some embodiments, the determining module 91 is further configured to: determine an identifier of a fourth target zone corresponding to an identifier of a to-be-erased zone according to the mapping relationship in response to receiving a data erase command issued by the host drive unit; and erase data in the fourth target zone, and label the fourth target zone as idle.

In some embodiments, the determining module 91 is further configured to: delete a correspondence relationship between the identifier of the to-be-erased zone and the identifier of the fourth target zone from the mapping relationship.

In some embodiments, the determining module 91 is further configured to: determine an identifier of a fifth target zone corresponding to an identifier of a to-be-read zone from the mapping relationship in response to receiving a data read command issued by the host drive unit, where the data read command carries the identifier of the to-be-read zone; and read data from the fifth target zone, and send the data to the host drive unit.

The wear leveling apparatus provided by the embodiment of the present disclosure may execute the technical solutions shown in the above method embodiments, having similar implementation principle and beneficial effects, which are not be repeated here.

FIG. 10 is a schematic structural diagram of an electronic device provided by an embodiment of the present disclosure.

As shown in FIG. 10, the electronic device of this embodiment may be the above SSD, and may include: a processor 101, a memory 102, and computer program instructions stored in the memory 102 and running on the processor 101. The processor 101, when executing the computer program instructions, implements the method according to any one of the foregoing embodiments.

In some embodiments, the processor 101 and the memory 102 of the electronic device may be connected through a system bus.

The memory 102 may be an independent storage unit or a storage unit integrated in the processor 101. There are one or more processors 101.

It is to be understood that the processor 101 may be a central processing unit (CPU), or be a general-purpose processor 101, a digital signal processor 101 (DSP), an application specific integrated circuit (ASIC), etc. The general-purpose processor 101 may be a microprocessor 101, or the processor 101 may be any conventional processor 101 or the like. The steps of the method disclosed in the present disclosure may be directly embodied as being executed by a hardware processor 101, or by a combination of hardware and software modules in the processor 101.

The system bus may be a peripheral component interconnect (PCI) bus or an extended industry standard architecture (EISA) bus. The system bus may be divided into an address bus, a data bus, a control bus, etc. For ease of representation, only one thick line is shown in drawing, but it does not indicate that there is only one bus or one type of bus. The memory 102 may include a random access memory (RAM) 102, and may further include a non-volatile memory (NVM) 102, such as at least one disc memory device 102.

All or part of the steps of the above method embodiments may be implemented by the hardware related to the program instructions. The foregoing programs may be stored in one readable memory 102. In execution of the programs, the steps of the above method embodiments are executed; and the foregoing memories 102 (storage media) include: a read-only memory 102 (ROM), a RAM, a flash memory 102, a hard disk, a solid-state hard disk, a magnetic tape, a floppy disk, an optical disc, and any combination thereof.

The electronic device provided in this embodiment is used for executing the method in any one of the above embodiments, and its implementation principle and technical effects may refer to the foregoing embodiments, which are not repeated here.

The embodiment of the present disclosure further provides a computer readable storage medium, storing computer-executable instructions, where the computer-executable instructions, when executed by a processor, implements the method in any one of the above embodiments.

The embodiment of the present disclosure further provides a computer program product, including a computer program that, when executed by a processor, implements the method in any one of the above embodiments.

In the several embodiments provided in the present disclosure, it is to be understood that the disclosed apparatus, device, and method may also be implemented in another manner. For example, the above-described device embodiments are merely schematic, for example, division of the modules is merely a logical function division, and there may be other division manners in actual realization, for example, a plurality of modules may be combined or integrated into another system, or some features may be ignored or not executed.

The integrated modules implemented in a form of software functional modules may be stored in a computer-readable storage medium. The above software functional modules are stored in a storage medium, including several instructions used to cause one computer device (which may be a personal computer, a server, or a network device, etc.) or the processor to execute part of the steps of the method described in each embodiment of the present disclosure.

It is to be understood that the above processor may be a central processing unit (CPU), or be a general-purpose processor, a digital signal processor (DSP), an disclosure specific integrated circuit (ASIC), etc. The general-purpose processor may be a microprocessor, or the processor may be any conventional processor or the like.

The steps of the method disclosed in the present disclosure may be directly embodied as being executed by a hardware processor, or by a combination of hardware and software modules in the processor. The memory may contain a high-speed RAM memory, may further include a non-volatile memory (NVM), such as at least one disc memory, or may be a U disk, a mobile hard disk, a read-only memory, a magnetic or optical disc, etc.

The storage medium may be implemented through any type or combination of volatile or non-volatile memory devices, such as a static random access memory (SRAM), an electrically erasable programmable read-only memory (EE-PROM), an erasable programmable read-only memory (EPROM), a programmable read-only memory (PROM), the read-only memory (ROM), a magnetic memory, the flash memory, the magnetic or optical disc. The storage medium may be any available medium accessible by a general-purpose or special purpose computer. An exemplary storage medium is coupled to the processor, so that the processor can read information from the storage medium, and write the information to the storage medium. Of course, the storage medium may also be integral to the processor. The processor and the storage medium may be located in the disclosure specific integrated circuits (ASICs). Of course, the processor and the storage medium may also reside as discrete components in the electronic device or a master device.

It should be noted that the terms "include", "comprise", or any variants thereof herein are intended to cover a non-exclusive inclusion, so that a process, method, article, or apparatus that includes a series of elements not only includes those elements, but also includes other elements not listed explicitly, or includes inherent elements of the process, method, article, or apparatus. In the absence of more limitations, an element defined by "include a . . . " does not exclude other same elements existing in the process, method, article, or apparatus including the element.

The serial numbers of the embodiments of the present disclosure are merely for description, and do not represent the advantages and disadvantages of the embodiments.

From the description of the above embodiments, it will be apparent to those skilled in the art that the methods of the above examples may be implemented by means of software plus a necessary general-purpose hardware platform, and of course may also be implemented by means of hardware, but in many cases the former is a better embodiment. On the basis of the understanding, the technical solution of the present disclosure may be embodied in a form of a software product in essence or a part contributing to the prior art, and the computer software product is stored in the storage medium (for example, the ROM/RAM, the magnetic disk, and the optical disk) as above, and includes several instructions for enabling a terminal device (like a mobile phone, a computer, a server, an air conditioner, a network device or the like) to execute the method of each embodiment of the present disclosure.

The above is only the preferred embodiments of the present disclosure, and does not limit the scope of patent of the present disclosure. Any equivalent structure or equivalent flow transformation made by using the contents of the specification and drawings of the present disclosure, or directly or indirectly applied to other related technical fields, is similarly included in the protection scope of the patent of the present disclosure.

What is claimed is:
1. A wear leveling method for a solid-state drive, comprising:
determining, according to a mapping relationship, an identifier of a first target zone corresponding to an identifier of a to-be-written zone in response to receiving a data write command issued by a host drive unit, wherein the data write command carries the identifier of the to-be-written zone determined by the host drive unit and to-be-written data, the mapping relationship comprises one or more entries, wherein each entry includes an identifier of an alternate zone corresponding to an identifier of a target zone, and the alternate zone of each target zone is a zone of the solid-state drive with fewest programmed/erased cycles, wherein each target zone in the mapping relationship has non-fewest programmed/erased cycles; and
writing the to-be-written data to the first target zone.
2. The method according to claim 1, wherein before the determining, according to a mapping relationship, an identifier of a first target zone corresponding to an identifier of a to-be-written zone, the method further comprises:
receiving a zone opening command from the host drive unit, wherein the zone opening command carries the identifier of the to-be-written zone;
determining, according to the zone opening command, the zone with the fewest programmed/erased cycles from the plurality of zones of the solid-state drive as the first target zone; and
recording the identifier of the to-be-written zone and the identifier of the first target zone into the mapping relationship.
3. The method according to claim 1, further comprising:
acquiring a second target zone with fewest programmed/erased cycles in the solid-state drive, wherein the second target zone is a valid zone; and
in response to a determination that a difference between an average number of programmed/erased cycles of all the plurality of zones of the solid-state drive and a number of programmed/erased cycles of the second target zone is larger than a threshold, migrating data in the second target zone to a third target zone with the fewest programmed/erased cycles, and labeling the second target zone as idle, wherein the third target zone is an idle zone.
4. The method according to claim 3, further comprising:
updating the identifier of the second zone to an identifier of the third target zone in the mapping relationship.
5. The method according to claim 1, further comprising:
determining, according to the mapping relationship, an identifier of a fourth target zone corresponding to an identifier of a to-be-erased zone in response to receiving a data erase command issued by the host drive unit; and
erasing data in the fourth target zone, and labeling the fourth target zone as idle.

6. The method according to claim 5, further comprising:

deleting a correspondence relationship between the identifier of the to-be-erased zone and the identifier of the fourth target zone from the mapping relationship.

7. The method according to claim 1, further comprising:

determining an identifier of a fifth target zone corresponding to an identifier of a to-be-read zone from the mapping relationship in response to receiving a data read command issued by the host drive unit, wherein the data read command carries the identifier of the to-be-read zone; and reading data from the fifth target zone, and sending the data to the host drive unit.

8. A solid-state drive (SSD), comprising:

a plurality of zones;

a mapping relationship; and an SSD controller, wherein the SSD controller is configured to:

determine, according to the mapping relationship, an identifier of a first target zone corresponding to an identifier of a to-be-written zone in response to receiving a data write command issued by a host drive unit, wherein the data write command carries the identifier of the to-be-written zone determined by the host drive unit and to-be-written data, the mapping relationship comprises one or more entries, wherein each entry includes an identifier of an alternate zone corresponding to an identifier of a target zone, and the alternate zone of each target zone is a zone of the solid-state drive with fewest programmed/erased cycles, wherein each target zone in the mapping relationship has non-fewest programmed/erased cycles; and write the to-be-written data to the first target zone.

9. The SSD according to claim 8, wherein before determining, according to a mapping relationship, an identifier of a first target zone corresponding to an identifier of a to-be-written zone, the SSD controller is further configured to:

receive a zone opening command from the host drive unit, wherein the zone opening command carries the identifier of the to-be-written zone;

determine, according to the zone opening command, the zone with the fewest programmed/erased cycles from the plurality of zones of the solid-state drive as the first target zone; and record the identifier of the to-be-written zone and the identifier of the first target zone into the mapping relationship.

10. The SSD according to claim 8, wherein the SSD controller is further configured to:

acquire a second target zone with fewest programmed/erased cycles in the solid-state drive, wherein the second target zone is a valid zone; and in response to a determination that a difference between an average number of programmed/erased cycles of all the plurality of zones of the solid-state drive and a number of programmed/erased cycles of the second target zone is larger than a threshold, migrate data in the second target zone to a third target zone with the fewest programmed/erased cycles, and label the second target zone as idle, wherein the third target zone is an idle zone.

11. The SSD according to claim 10, wherein the SSD controller is further configured to:

update the identifier of the second zone to an identifier of the third target zone in the mapping relationship.

12. The SSD according to claim 8, wherein the SSD controller is further configured to:

determine, according to the mapping relationship, an identifier of a fourth target zone corresponding to an identifier of a to-be-erased zone in response to receiving a data erase command issued by the host drive unit; and erase data in the fourth target zone, and label the fourth target zone as idle.

13. The SSD according to claim 12, wherein the SSD controller is further configured to:

delete a correspondence relationship between the identifier of the to-be-erased zone and the identifier of the fourth target zone from the mapping relationship.

14. The SSD according to claim 8, wherein the SSD controller is further configured to:

determine an identifier of a fifth target zone corresponding to an identifier of a to-be-read zone from the mapping relationship in response to receiving a data read command issued by the host drive unit, wherein the data read command carries the identifier of the to-be-read zone; and read data from the fifth target zone, and send the data to the host drive unit.

15. A non-transitory computer readable storage medium, storing computer-executable instructions, wherein the computer-executable instructions, when executed by a processor, are configured to implement a wear leveling method, and the wear leveling comprises:

determining, according to a mapping relationship, an identifier of a first target zone corresponding to an identifier of a to-be-written zone in response to receiving a data write command issued by a host drive unit, wherein the data write command carries the identifier of the to-be-written zone determined by the host drive unit and to-be-written data, the mapping relationship comprises one or more entries, wherein each entry includes an identifier of an alternate zone corresponding to an identifier of a target zone, and the alternate zone of each target zone is a zone of the solid-state drive with fewest programmed/erased cycles, wherein each target zone in the mapping relationship has non-fewest programmed/erased cycles; and writing the to-be-written data to the first target zone.

* * * * *